United States Patent [19]

Fette

[11] 4,380,051
[45] Apr. 12, 1983

[54] HIGH SPEED DIGITAL DIVIDER HAVING NORMALIZING CIRCUITRY

[75] Inventor: Bruce A. Fette, Mesa, Ariz.

[73] Assignee: Motorola, Inc., Schaumburg, Ill.

[21] Appl. No.: 211,009

[22] Filed: Nov. 28, 1980

[51] Int. Cl.³ .............................................. G06F 7/54
[52] U.S. Cl. .................................................. 364/766
[58] Field of Search ........................................ 364/766

[56] References Cited

U.S. PATENT DOCUMENTS

| | | | |
|---|---|---|---|
| 3,209,131 | 9/1965 | Harper | 364/766 X |
| 3,222,505 | 12/1965 | Booher | 364/766 |
| 3,378,677 | 4/1968 | Waldecker et al. | 364/766 |
| 3,492,468 | 1/1970 | Frye | 364/766 |

OTHER PUBLICATIONS

Basu et al, "On a Simple Post Correction for Nonrestoring Division", *IEEE Trans. on Computers*, Oct. 1975, pp. 1019-1020.

Sanyal, "An Algorithm for Nonrestoring Division", *Computer Design*, May 1977, pp. 124-127.

Lemaire et al, "Improved Non-Restoring Division", *IBM Tech. Disclosure Bulletin*, vol. 23, No. 3, Aug. 1980, pp. 1149-1151.

*Primary Examiner*—David H. Malzahn
*Attorney, Agent, or Firm*—Eugene A. Parsons

[57] ABSTRACT

In a non-restoring divider circuit each divider step is completed in a single clock pulse by comparing the most significant bits and utilizing a continuous type of comparison to gate data into adding circuits, the summation output of which is introduced into the next most significant gate of the numerator to replace the data previously in the numerator with shifted summation data. Prior to the dividing operation the bits in the three most significant stages of the denominator are compared and the data in the shift registers is shifted by two spaces each clock pulse until the comparison indicates that the data is normalized or until a single clock pulse will complete the normalization of the data.

7 Claims, 8 Drawing Figures

HIGH SPEED DIGITAL DIVIDER HAVING NORMALIZING CIRCUITRY

BACKGROUND OF THE INVENTION

In high speed digital circuitry and especially divider circuits it is often desirable to normalize data stored in registers prior to performing various mathematical operations, such as dividing. Normalization is the shifting of data in a register, such as a shift register, toward the most significant bit stage until the first significant bit in the data has been shifted into the most significant bit stage. In some instances the most significant bit stage in a register may be utilized to store a sign bit and the data is considered normalized when the first significant bit in the data is shifted into the second most significant bit stage.

In the prior art, data stored in shift registers is normalized in one of two ways. In a first method of normalization relatively complicated sensing circuitry is utilized to determined the position of the first significant bit of the data relative to the most significant bit stage of the shift register. A signal is then supplied to shifting circuitry which shifts the data as many stages as required in a single clock pulse. Circuitry of this type is disclosed in copending U.S. application entitled "Digital Scaling Apparatus", Ser. No. 06/134,859, filed Mar. 28, 1980 now U.S. Pat. No. 4,335,372, issued June 15, 1982.

In a second type of normalizing circuitry the data is stored in a shift register and shifted serially, one stage per clock pulse, until the first significant bit of data is shifted into the most significant bit stage. This prior art method of normalization requires a larger number of clock pulses, since the date could be shifted the entire length of the shift register.

In digital non-restoring divider circuits, wherein the dividend or remainder is compared to the divisor, multiplied by two or shifted one stage, and the divisor is added or substracted with the shifted dividend in each of a plurality of operations, it is not uncommon for prior art circuitry to require four or five clock pulses to execute each of the plurality of one bit by n bit operations or divisions.

SUMMARY OF THE INVENTION

The present invention pertains to high speed digital non-restoring divider circuitry, which may be formed on a single semiconductor monolithic integrated circuit, including a first plural stage register connected to have a dividend stored therein, a second plural stage register connected to have a divisor stored therein, add/substract means and comparing means for performing non-restoring divide operations with the add/subtract means connected to the registers so that the summation is introduced into the first register, in place of the dividend or previous remainder, in a shifted position to accomplish a complete one bit by n bit division operation with a single clock pulse.

The digital circuitry includes first and second comparators connected to the second register for comparing the three most significant bit stages to determine the position of the first significant bit of data, and controllable connecting means for shifting data in the first and second registers a plurality of stages per clock pulse until the comparators indicate that the data is normalized or until the comparators indicate that a single stage shift will complete the normalization.

It is an object of the present invention to provide a new and improved high speed digital, non-restoring divider circuit.

It is a further object of the present invention to provide a high speed digital, non-restoring divider circuit wherein each one bit by n bit division operation is performed with a single clock pulse.

It is a further object of the present invention to provide a high speed digital circuit with improved normalizing circuitry.

It is a further object of the present invention to provide a high speed digital, non-restoring divider circuit with improved normalization wherein the entire circuit is included on a single semiconductor chip.

These and other objects of this invention will become apparent to those skilled in the art upon consideration of the accompanying specification, claims and drawings.

BRIEF DESCRIPTION OF THE DRAWINGS

The FIGS. 1A, 1B, 1C, 1D, 1E, 1F and 1G form an interconnection diagram for a high speed digital non-restoring divider circuit embodying the present invention.

DESCRIPTION OF THE PREFERRED EMBODIMENT

Figures 1, 2:
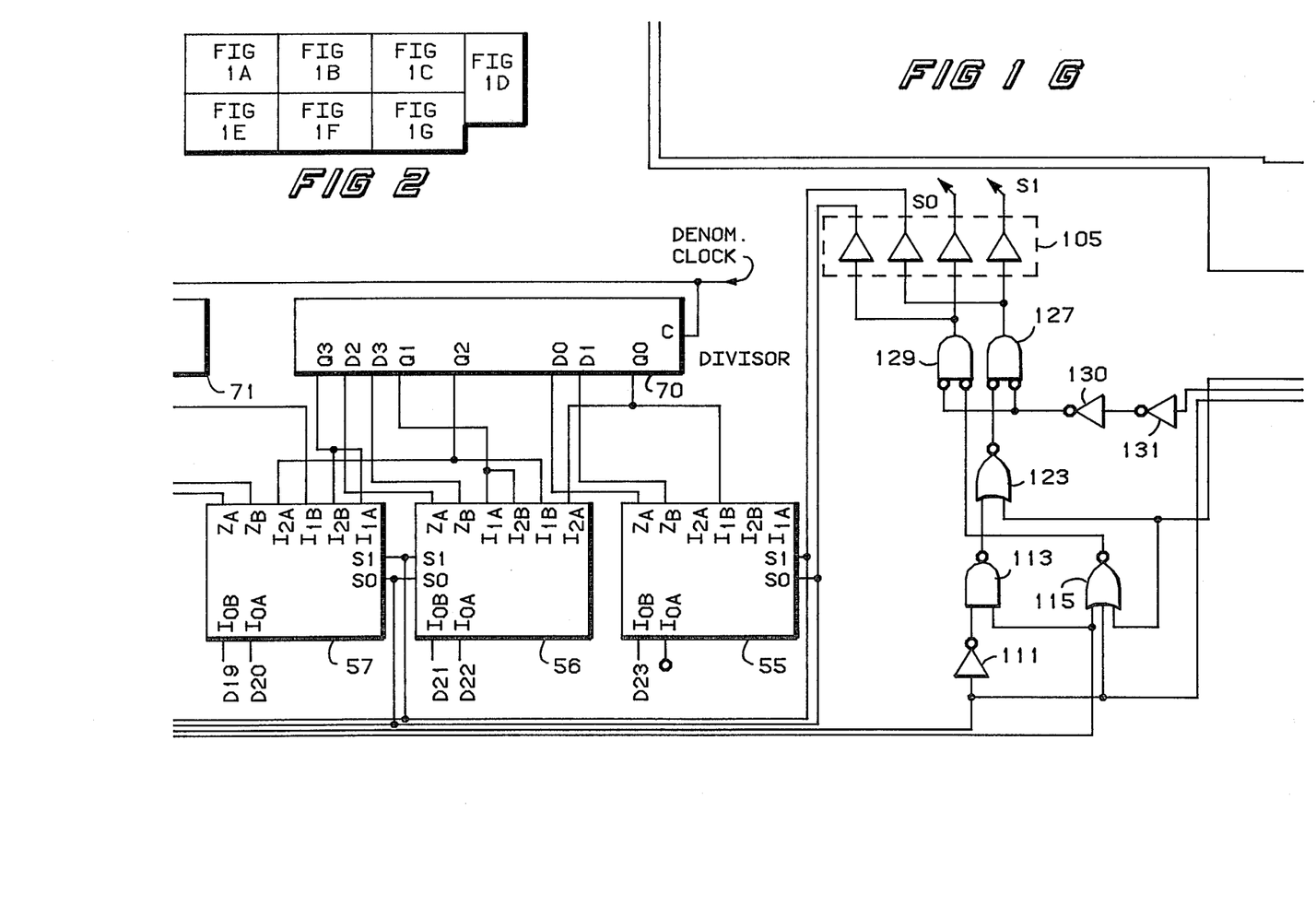
FIG. 2 is a key plan illustrating the association of FIGS. 1A through 1G.
Figure 1A:
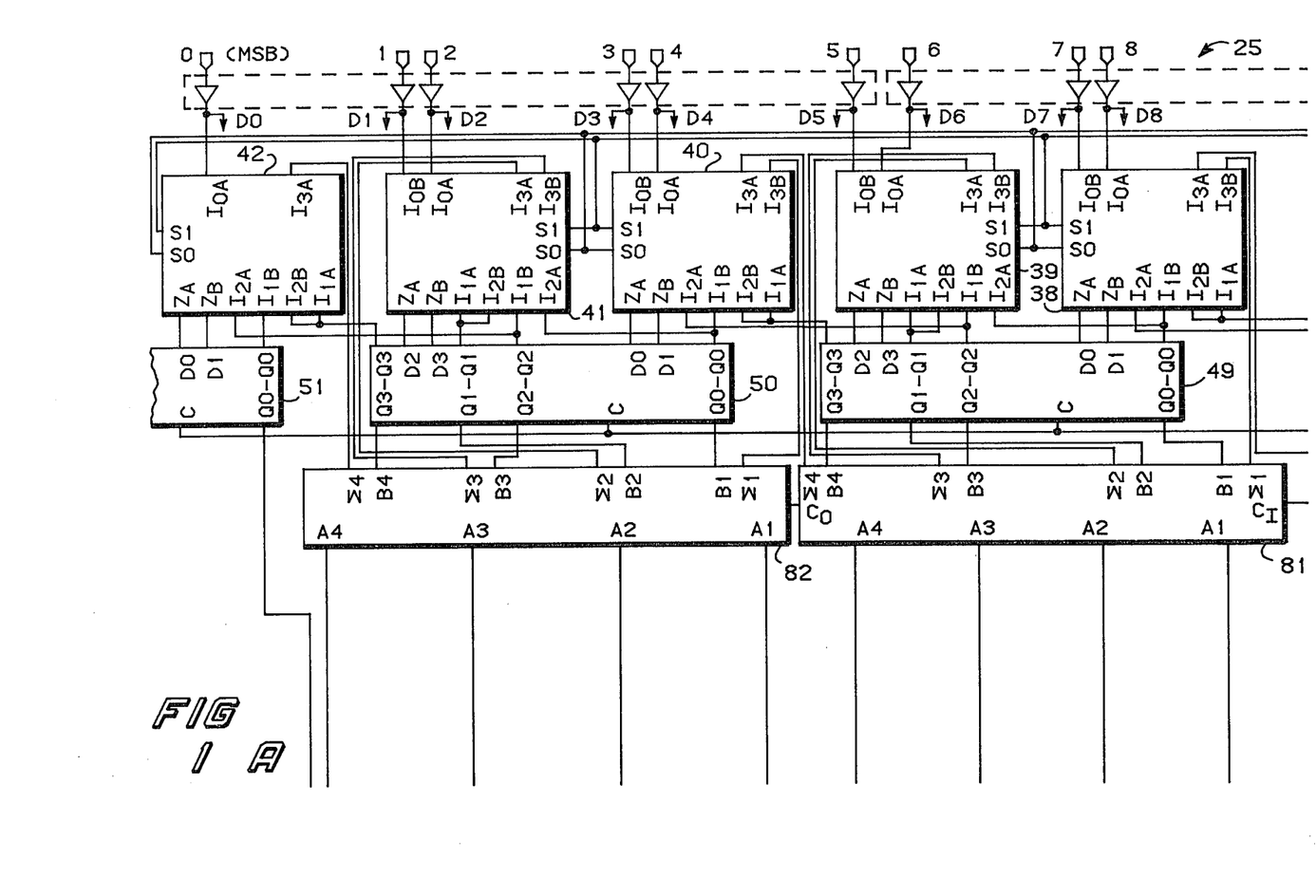
Figure 1B:
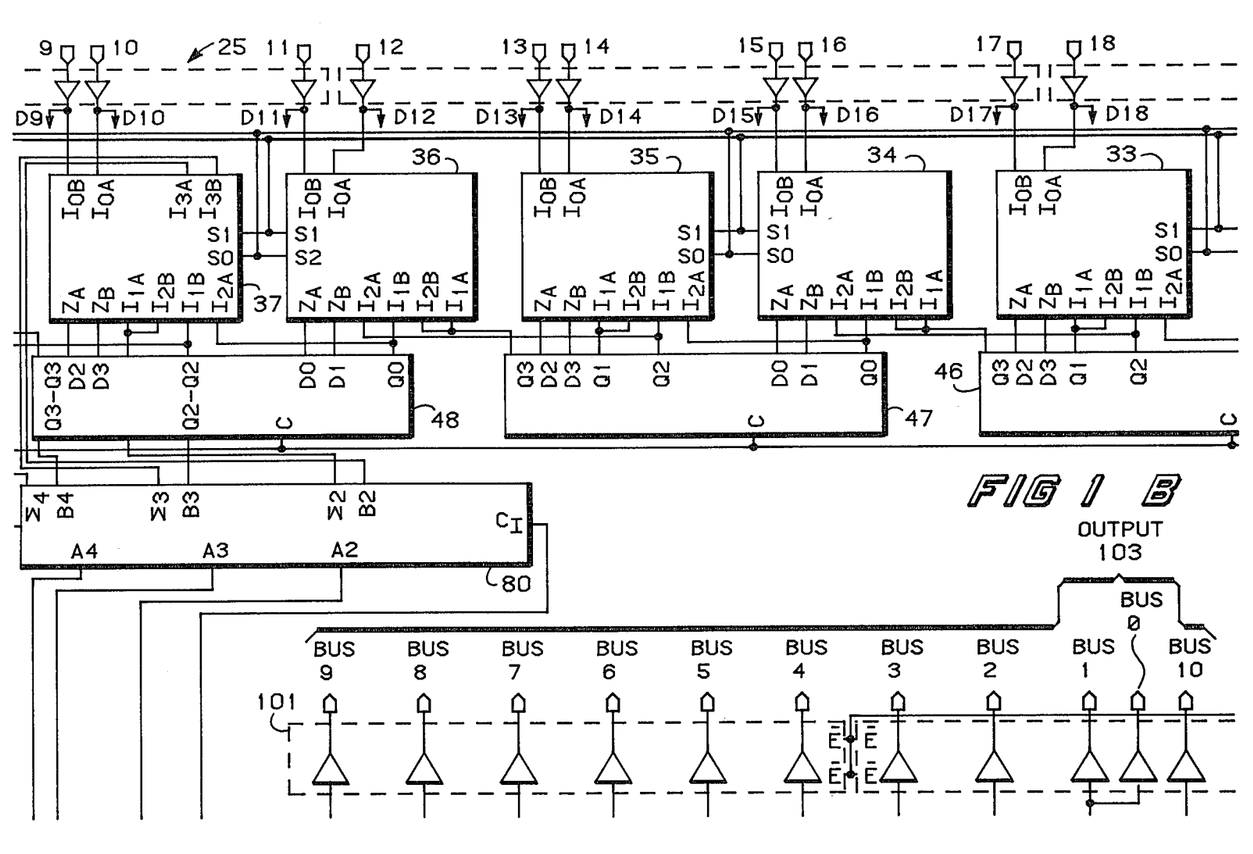
Figure 1C:
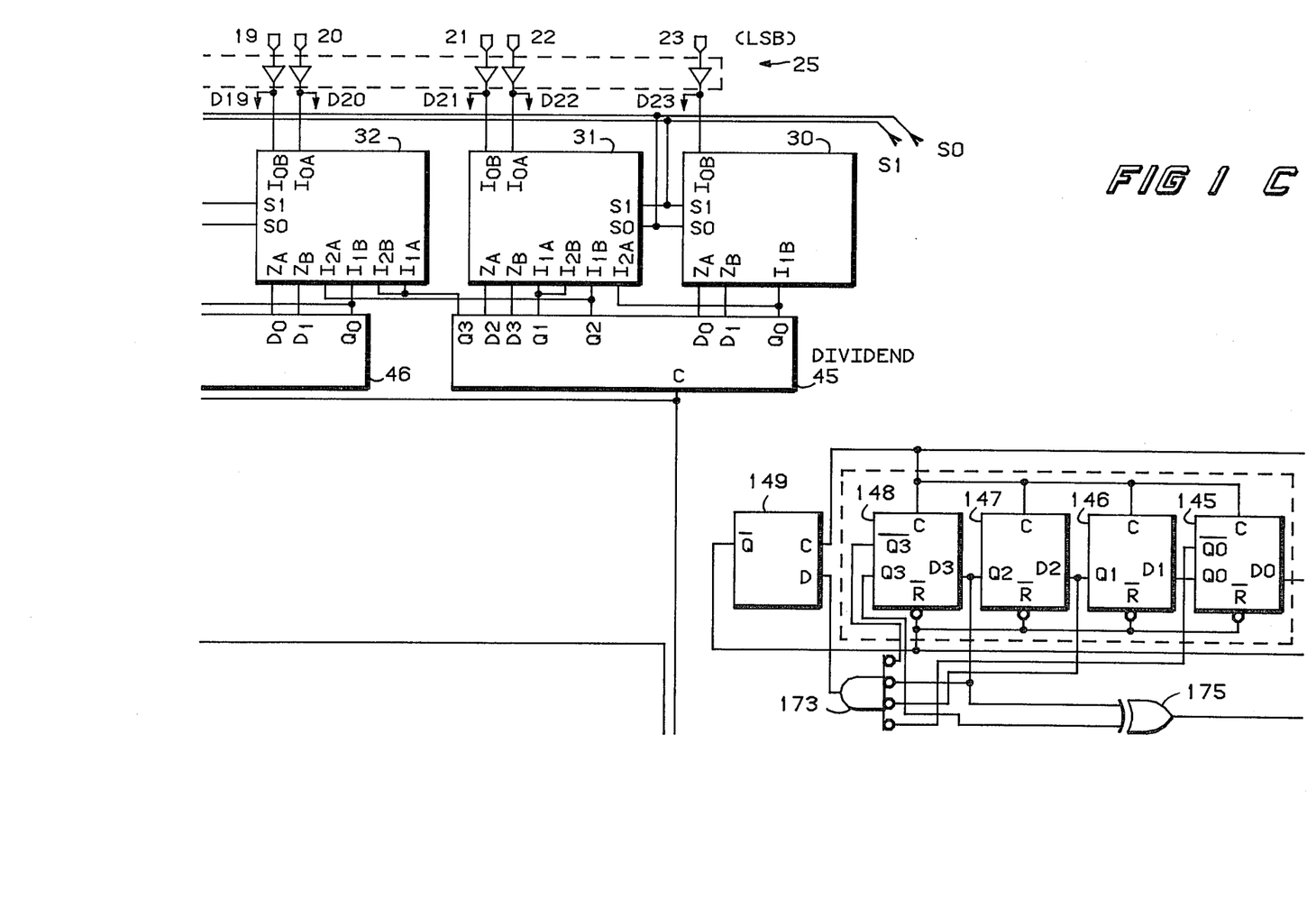
Figure 1D:
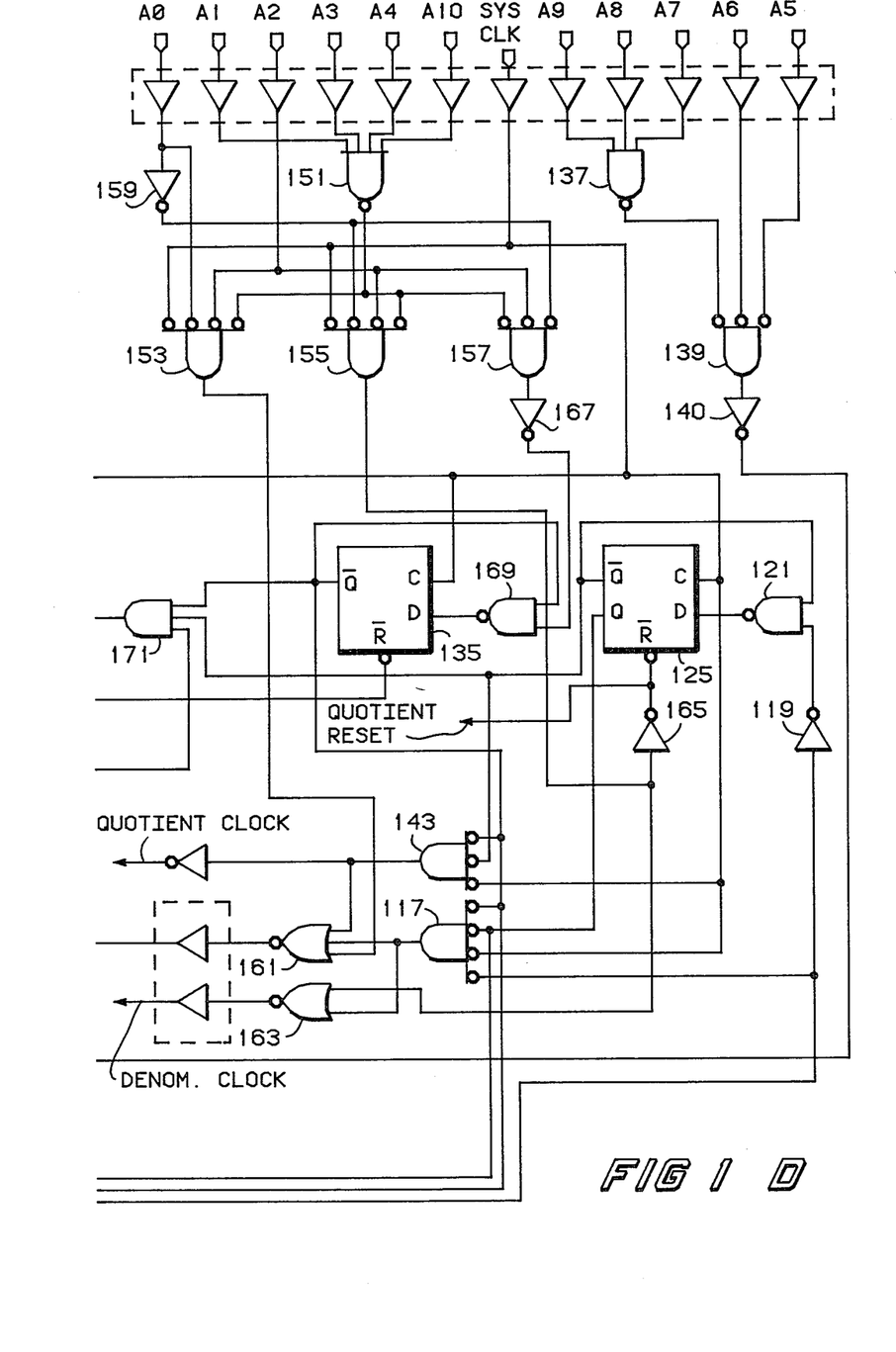
Figure 1E:
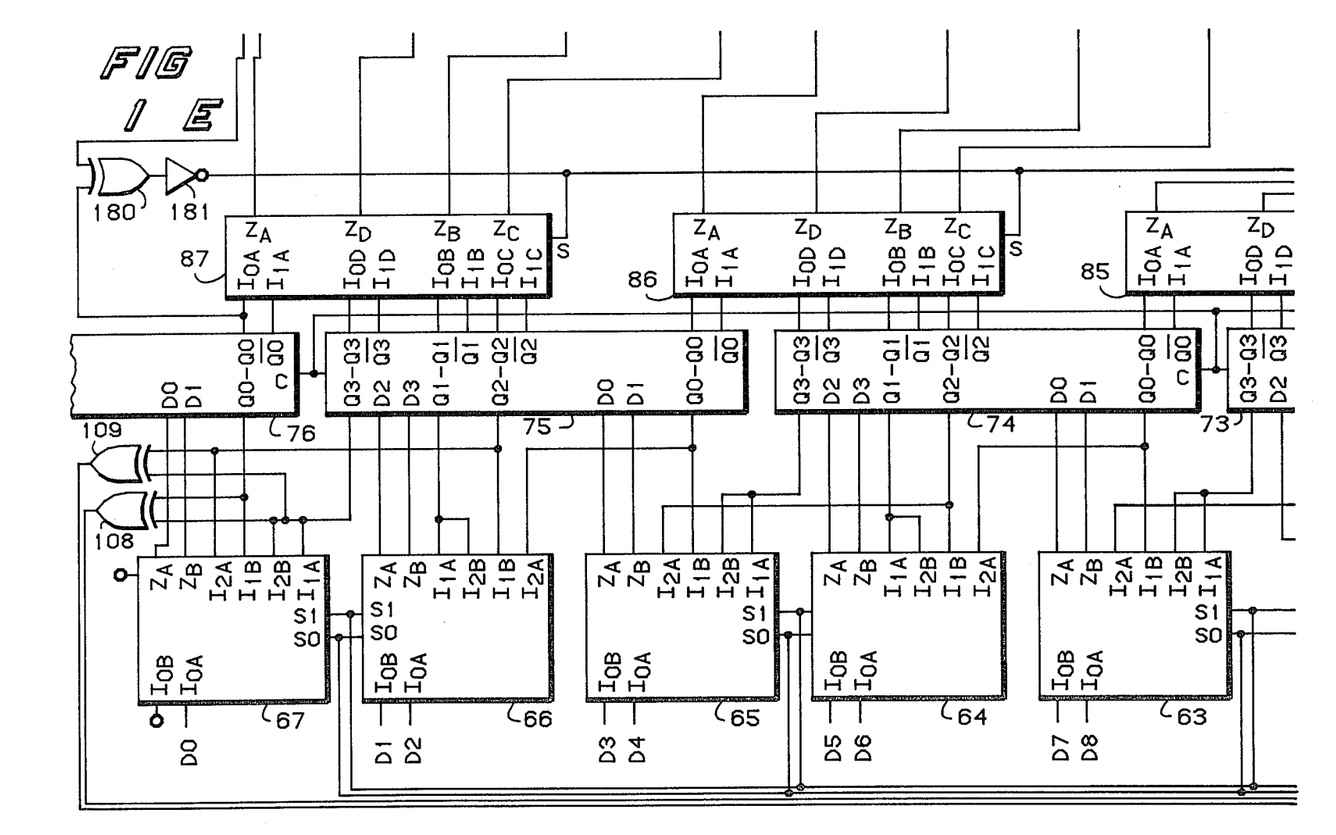
Figure 1F:
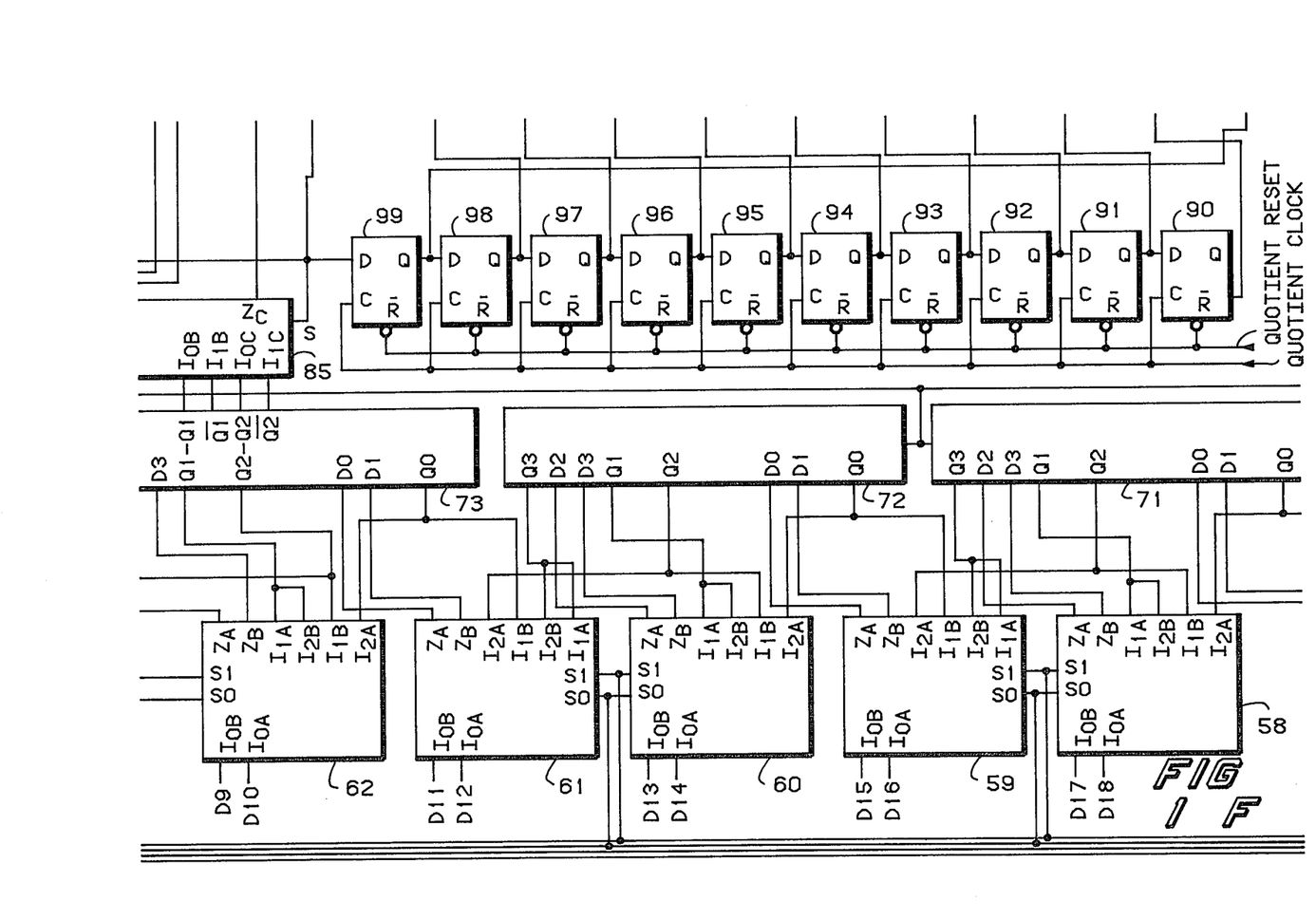

Referring specifically to the interconnection diagram (FIGS. 1A through 1G with FIG. 2 illustrating the key plan), it will be noted that the divider circuit is formed from a plurality of IC chips, each of which is commercially available. The various portions of the divider circuit are illustrated and disclosed as pluralities of individual IC chips, rather than a single IC chip for simplicity of description and understanding. While specific commercially available IC chips will be described for a complete understanding of the disclosure, it should be understood by those skilled in the art that these chips are only utilized for purposes of example and many other types of chips and/or circuits might be utilized, or substituted, by those skilled in the art. Further, while shift registers are used throughout the description it will be understood by those skilled in the art that other registers might be utilized.

The present divider circuit is constructed to operate on twenty-four bits which are applied to the circuit at twenty-four inputs designated 0 through 23, with 0 being the most significant bit and 23 being the least significant bit. The twenty-four input terminals are connected through buffer stages, generally designated 25 to thirteen dual four input multiplexing chips, herein illustrated as commercially available 74LS253 chips, designated 30 through 42. The buffer stages connected to the above described inputs and other buffer stages utilized throughout the following disclosure may be, for example, commercially available chips designated 74LS367A. The thirteen multiplexing chips 30 through 42 are associated with a first register connected to receive the numerator or dividend as will be described presently, designated 45 through 51, and illustrated herein as commercially available shift register chips 74LS175. The twenty-four input terminals, at the outputs of the buffer 25 are also connected to thirteen four input multiplexer chips 55 through 67, by way of terminals designated D0 through D23. The thirteen multiplexer chips 5 through 67 are illustrated as similar to the thirteen multiplexer chips 30 through 42, for purposes of standardization, but it will be understood by those skilled in the art that this is not a requirement. The thirteen multiplexer chips 55 through 67 are associated with a second shift register connected to receive the denominator or divisor, as will be described presently, formed from seven four stage shift register chips 70 through 76, which chips are similar to the chips in the first shift register for simplicity and standardization.

While the input numbers are represented by twenty-four bit digital words, in this disclosure, only the eleven most significant bits are utilized in the dividing process. Therefore, it is essential to normalize the input words before performing the division process, which normalization process will be described presently. The addition/subtraction step of the non-restoring divider process is performed by three 4-bit binary full adder chips, designated 80, 81 and 82, and illustrated in this embodiment as commercially available adder chips 74LS 283. The eleven most significant bits, or the 2's complement of the eleven most significant bits, of the denominator or divisor are supplied to the adder chips 80–82 through three quad two input multiplexer circuits 85, 86 and 87, herein illustrated as commercially available chips 74LS257A. The quotient, or output, of the divider circuit is available at a quotient register, herein illustrated as ten single stages 90 through 99, each stage being represented by a commercially available chip 74LS74A. The outputs of the quotient register are supplied through a buffer stage 101 to eleven output terminals generally designated 103.

To conform with nomenclature relatively common in the art, inputs to the various shift registers are designated D and outputs are designated Q or Q̄ and plural inputs or outputs have an additional number added (i.e. 0, 1, 2, 3) to designate the number of the input or output. Inputs to the various multiplexing circuits are designated with an I and a letter and number to indicate the specific circuit and input or output of that circuit. Outputs of the various multiplexing circuits are designated with a Z and a letter to indicate the specific circuit of the IC. In some instances, as for example the multiplexing circuits 30 and 55 and the shift registers 51 and 76, only a portion of the IC chip is utilized to make up the full twenty-four bit word being operated upon. Because of the similarity of all of the connections and circuits, only a few of the connections will be described and the remaining connections will be obvious therefrom to those skilled in the art.

The least signficant bit at the input 23 is connected to input $I_{0B}$ of the multiplexer 30 input $I_{0A}$ of which is grounded. Input $I_{1B}$ is connected to the Q0 output of the shift register 45. The remaining inputs of the multiplexer 30 are not used. A first output ZA of the multiplexer 30 is connected to a first input D0 of the register 45 and a second output ZB of the multiplexer 30 is connected to a second input D1 of the register 45. Input terminals 21 and 22 of the divider circuit are connected to input terminal $I_{0B}$ and $I_{0A}$, respectively, of multiplexer 31. Inputs $I_{1A}$ and $I_{2B}$ of the multiplexer 31 are connected to the Q1 output of the multiplexer 45, input $I_{1B}$ is connected to the output Q2 and input $I_{2A}$ is connected to the output Q0. Outputs ZA and ZB of the multiplexer 31 are connected to inputs D2 and D3 of the register 45, respectively.

Thus, the multiplexers 30 and 31 provide three modes of operation in conjunction with the register 45. In a first mode of operation the data at the input terminals 21, 22 and 23 is loaded directly into the inputs D3, D2 and D1 of the register 45. In a second mode of operation output Q0 of the register 45 is connected to input D1, output Q1 is connected to input D2 and output Q2 is connected to input D3 so that all of the data stored in the register is shifted one stage. In a third mode of operation output Q0 is connected to input D2 of register 45, output Q1 is connected to input D3 of register 45, output Q2 of register 45 is connected to input D0 of register 46 and output Q3 of register 45 is connected to input D1 of register 46 so that all of the data in shift register 45 is shifted two stages for each clock pulse applied thereto. The remaining registers 46 through 51 and the associated multiplexing circuits 32 through 42 are similarly connected and the registers 70 through 76 and associated multiplexing circuits 55 through 67 of the second register are also similarly connected.

All of the multiplexing circuits 30 through 42 and 55 through 67 have a pair of selection inputs, designated S1 and S0, which are connected through a buffer 105 to a logic network which will be described presently. The multiplexing circuits 30 through 42 are connected so that a zero on each of the lines S0 and S1 is the first mode of operation, a zero on S0 and a one on S1 is the second mode of operation, a one on S0 and a zero on S1 is the third mode of operation and a one on both of the inputs S0 and S1 starts the division operation. The multiplexing circuits 5 through 67 are connected so that a zero on both of the select inputs S0 and S1 indicates the division is complete and new values should be loaded therein (first mode of operation), a one on the S0 input and a zero on the S1 input places the multiplexers in the second mode of operation, a zero on the S0 input and a one on the S1 input places the multiplexers in the third mode of operation and a one on both of the S0 and S1 inputs instructs a conditional add/subtract operation.

Data in the first and second shift registers is normalized as follows. Only the data in the second shift register (70 through 76) is monitored and data in both the first and second registers is shifted simultaneously until the data in the second register is normalized. A pair of exclusive OR gates 108 and 109, in this embodiment commercially available IC chips 74LS86, are used to monitor data in the second shift register. A first input of the gate 108 is connected to output Q0 of register 76 and a second input is connected to output Q3 of register 75. A first input of gate 109 is connected to output Q3 of register 75 and a second input is connected to output Q2 of register 75. The output of the gate 108 is connected through an inverter 111 to an input of a NAND gate 113, an input of a NOR gate 115, an input of a gate 117 which provides a NOR function, and through an inverter 119 to an input of a NAND gate 121. The output of gate 109 is connected to one input of the NAND gate 113 and one input of the NOR gate 115. The output of the NAND gate 113 is connected to one input of a NOR gate 123 the other input of which, along with a third input to the NOR gate 115 and a second input of the gate 117, is connected to the Q output of a normalized flip-flop 125. The output of the NOR gate 123 is connected to one input of a gate 127 which performs a NOR function. The output of the NOR gate 115 is connected to one input of a gate 129 which provides a NOR function. Each of the gates 127 and 129 has an input connected through two inverters 130 and 131 to the Q output of a start divide flip-flop 135.

During the normalizing operation the Q output of the flip-flop 125 is zero and the not Q output of the flip-flop 135 is zero. Also, in the specific embodiment being described the most significant bit in the first and second shift registers (Q0 of registers 51 and 76, respectively) are sign bits and are not altered during normalization. If a zero bit is available at the Q0 output of register 76 and Q3 and Q2 outputs of registers 75 the data in the second register is not normalized since at least the first two data positions do not contain a significant bit of data. Gate 108 supplies a zero at its output which is connected to one input of the NOR gate 115 and is inverted in the inverter 111 to supply a one to one input of the NAND gate 113. Gate 109 supplies a zero to a second input of the NOR gate 115 and NAND gate 113. Since NAND gate 113 has a one and a zero at the inputs thereof the output is a one. Since the NOR gate 115 has all zeros applied to the inputs thereof the output is a one. NOR gate 123 has a one and a zero applied to the inputs thereof so that the output is a zero which is applied to gate 127 along with the zero from the inverter 130 to provide a one at the output thereof. The one at the output of NOR gate 115 is applied to the gate 129 along with a zero from the inverter 130 to provide a zero at the output thereof. The output of the gate 127 is connected to the S1 terminals of the multiplexing circuits 30 through 42 and 55 through 67 by the buffer 105 and the output of the gate 129 is connected to the S0 terminals of the same multiplexers by the buffer 105. Thus, with the signals supplied to the gates 108 and 109 described below the logic circuitry selects the double shift mode of operation in the multiplexing circuits 30 through 42 and 55 through 67.

If one bit of significant data is shifted into the third most significant bit (Q2 output of register 75) the output of gate 109 changes to a one while the output of gate 108 remains a zero. This causes the outputs of the gates 127 and 129 to shift to a zero and one, respectively, which selects the one bit shift mode of operation in the multiplexing circuits 30 through 42 and 55 through 67. When the first significant bit of data is finally shifted into the last data bit position (output Q3 of register 75) the output of gate 108 is changed to a one which is supplied through the inverter 119 to the input of NAND gate 121, the output of which causes the normalizing flip-flop 125 to change states and supply a one to the NOR gates 115 and 123, which stops the normalizing procedure.

By monitoring the three most significant bits in the second shift register (registers 70 through 76) and shifting data by two stages in the shift registers as long as the first significant bit is at least three positions from the most significant bit, the number of clock pulses required to normalize data in the shift registers is reduced by nearly one-half. Further, it will be apparent from the foregoing disclosure that a one in the most significant bit position will alter the logic circuitry so that the first significant bit (a zero) must be shifted into the second most significant bit position before the normalizing is complete. Thus, the normalizing circuitry disclosed herein substantially reduces the time required for the operation of the divider circuit. While the divider circuit might further be modified so that data would be shifted more than two stages for each clock pulse in accordance with the teachings herein, it is believed that a shift of two stages provides the maximum trade-off between speed and the amount of circuitry required to perform the shifting procedures for monolithic IC implementation.

A plurality of terminals labeled A0 through A10 and "system clock" are provided for receiving control signals thereon to operate the divide circuit as constructed. Input terminals A7 through A9 are connected to a NAND gate 137, the output of which is connected to an input of a gate 139, along with the terminals A5 and A6, which gate provides a NOR function. The output of the gate 139 is connected through an inverter 140 to the buffer 101 to enable the buffer 101 and supply output signals stored therein to the output terminals 103. The system clock pulses are supplied to the gate 117, a gate 143 (which supplies a NOR function), the normalize flip-flop 125, the start divide flip-flop 135, and a plurality of five flip-flops 145 through 149 making up a divide stop counter. Inputs A1, A3, A4 and A10 are applied to a NAND gate 151 the output of which is applied to three gates 153, 155 and 157, all of which perform a NOR function. Input A0 is applied directly to gate 153 and a version inverted by inverter 159 is applied to gates 155 and 157. Input terminal A2 is connected directly to the three gates 153, 155 and 157. The system clock is also connected to the gate 153 and 155.

The output of the gate 153 is applied to a NOR gate 161 along with outputs from the gates 117 and 143, the output of which is a negative going numerator clock pulse which is supplied to the clock inputs of each of the registers 45 through 51. The output of the gate 155 is connected directly to a NOR gate 163 along with the output of the gate 117 and the output thereof is a series of negative going denominator clock pulses which are applied to each of the shift registers 70 through 76. The output of the gate 155 is also inverted by an inverter 165 and applied to the normalize flip-flop 125 as a CO input. Signals out of the gate 157 are inverted by an inverter 167 and applied to one input of a NAND gate 169 the second input of which is connected to the Q output of the start divide flip-flop 135.

With the proper signal at the output of the inverter 167, the start divide flip-flop 135 provides a zero to the inverter 131 allowing normalization of the data. Once the data is normalized and a one is applied to the normalized flip-flop 125, a gate 171 supplies a continuous one to the input of the first flip-flop 145 of the divide stop counter. Each clock pulse then causes a new one bit to be clocked into the counter. An output from each of the first four counters 145 through 148 is supplied to a gate 173, which provides a NOR function, and the output thereof is supplied to the input of the final flip-flop 149. The output of the flip-flops 147 and 148 are also applied to an exclusive OR gate 175 which supplies an output to the gate 171. Once the final flip-flop 149 is operated the division is completed and the output therefrom resets all of the flip-flops 135, 145, 146, 147 and 148. The divide circuit is then ready for a new set of data to be loaded into the shift registers. The divide stop counter simply ensures that the divide circuit cannot perform more than ten one bit by twelve bit division operations for each data word loaded therein.

The non-restoring method of digital division as explained, for example, in a book entitled "Digital Computer Design Fundamentals", written by Yaohan Chu, published by McGraw-Hill Book Company, Inc. and copyrighted 1962, is well known to those skilled in the art. Basically, the sign bits from the first and second registers (Q0 of register 51 and Q0 of register 76), are compared in an exclusive OR circuit 180, the output is inverted by an inverter 181 and applied to select inputs of the multiplexing circuits 85, 86 and 87. If the signs are the same the multiplexing circuits 85, 86 and 87 supply the 2's complement of the divisor stored in the registers 73, 74, 75 and 76 to the add circuits 80, 81 and 82. If the signs are different the divisor from the registers 73, 74, 75 and 76 is applied directly through the multiplexing circuits 85, 86 and 87 to the add circuits 80, 81 and 82. Thus, the substracting or adding requirements for the non-restoring divide method are fulfilled.

The outputs of the add circuits 80, 81 and 82 are labeled with a Σ symbol and a number indicating the number of the output from the IC chip, i.e. Σ 4 in add circuit 82 is the most significant bit output and Σ 2 is the least significant bit output from add circuit 80. Each of the eleven outputs from the add circuits 80, 81 and 82 are supplied to an input, which is transposed one higher bit, of the shift registers 48, 49, 50 and 51. For example, Σ 2 of the add circuit 80 is the sum of bits available at the outputs Q1 of register 48 and Q2 or Q2 of register 73, by way of multiplexing circuit 85 ($Z_C$ output). Σ 2 is returned through input I3A of multiplexer 37 and output ZA thereof to the input D2 of register 48. Thus, the summation is shifted upwardly one stage (multiplied by two) as required by the non-restoring division method. This multiplication or shifting of the remainder is accomplished with the same clock pulse which is required for the division operation and, therefore, substantially increases the speed of the divider circuit. Each of the ten possible division operations (limited by the divide stop counter) is performed with a single clock pulse because of the unique connection of the various components.

Therefore, a high speed digital, non-restoring divider circuit is disclosed which executes one bit by n bit division operations for each clock pulse of the system clock. This circuit is relatively simple and provides flexibility to be implemented monolithically in a bus oriented microprocessor while not tying up the internal data bus when performing its division. In addition, the data in the divide circuit is normalized with substantially fewer clock pulses so that the entire divide operation of the divide circuit is substantially faster than prior art non-restoring divider circuits utilizing a serial normalizing procedure. Further, the entire divider circuit can be easily incorporated into a single monolithic IC chip as illustrated in FIG. 2.

While we have shown and described a specific embodiment of this invention, further modificatons and improvements will occur to those skilled in the art. We desire it to be understood, therefore, that this invention is not limited to the particular for shown and we intend in the appended claims to cover all modifications which do not depart from the spirit and scope of this invention.

I claim:

1. A high speed digital, non-restoring divider circuit for obtaining a quotient from a multi-bit divisor and a multi-bit dividend, said divider circuit comprising:
   (a) a first register including a plurality of stages connected to have the dividend stored therein;
   (b) a second register including a plurality of stages connected to have the divisor stored therein;
   (c) add/substract means connected to said first and second registers and having a control signal input for selectively, in response to a control signal, adding one of the divisor and a 2's complement of the divisor to the dividend to produce a multi-bit sum, said add/substract means having a summation output at which the sum is provided;
   (d) comparing means connected to said first and second registers for comparing a most significant bit in each of said registers and having an output connected to the control signal input of said add/substract means for supplying a control signal thereto in response to a predetermined comparison of the most significant bits; and
   (e) connecting means connecting said add/substract means to said first register so that the multi-bit sum replaces the dividend in a shifted orientation.

2. A high speed digital, non-restoring divider circuit as claimed in claim 1 wherein the add/substract means includes a plurality of digital adder cells, each having an output and two inputs and a plurality of multiplexing circuits, each having a control signal input, said multiplexing circuits being connected to supply one of the divisor and a 2's complement of the divisor to said adder cells in response to a control signal on the control signal inputs.

3. A high speed digital, non-restoring divider circuit as claimed in claim 2 wherein the comparing means includes an exclusive OR function circuit having two inputs, one each connected to the most significant bit of the first and second registers, and an output connected to the control signal inputs of the multiplexing circuits in the add/substract means for supplying the control signals thereto.

4. A high speed digital, non-restoring divider circuit as claimed in claim 1 including in addition multiplexing means connected to inputs of each of the plurality of stages in the first and second registers, said multiplexing means having three modes of operation, a first mode wherein data is entered directly into each stage from an external source, a second mode wherein data is shifted from one stage to the next highest adjacent stage, and a third mode wherein data is shifted two stages, said multiplexing means having control inputs adapted to receive control signals for switching said multiplexing means between modes.

5. A high speed digital, non-restoring divider circuit as claimed in claim 4 including in addition first comparator means connected to compare the status of the most significant bit stage to the second most significant bit stage of one of the first and second registers and provide a first control signal when the status differs, second comparator means connected to compare the status of one of the most significant bit stage and the second most significant bit stage to the third most significant bit stage of the one of the first and second registers and providing a second control signal when the status differs, and logic circuitry connecting the first and second control signals to the multiplexing means for controlling said multiplexing means between the third and second modes of operation during normalizing of data.

6. A high speed digital, non-restoring divider circuit as claimed in claim 5 wherein the first and second comparator means each include an exclusive OR function circuit.

7. A high speed digital, non-restoring divider circuit as claimed in claim 1 wherein the first and second registers, the add/substract means, the comparing means and the connecting means are formed on a single semiconductor chip.

* * * * *

UNITED STATES PATENT AND TRADEMARK OFFICE
CERTIFICATE OF CORRECTION

PATENT NO. : 4,380,051
DATED : April 12, 1983
INVENTOR(S) : Bruce A. Fette et al It is certified that error appears in the above-identified patent and that said Letters Patent is hereby corrected as shown below:

On the title page, inventors should read

-- Bruce A. Fette, Mesa, Arizona
   Bill E. Tennyson, Paradise Valley, Arizona --.

Signed and Sealed this

Twenty-first Day of June 1983

[SEAL]

Attest:

DONALD J. QUIGG

Attesting Officer     Acting Commissioner of Patents and Trademarks